Aug. 12, 1958 W. KLOEPFER 2,847,563

CIRCUIT ARRANGEMENT FOR THE CONNECTION OF TWO-WIRE CIRCUITS TO A TRANSMISSION PATH IN INTERCOMMUNICATION SYSTEMS

Filed Oct. 30, 1953 2 Sheets-Sheet 1

INVENTOR
W. KLOEPFER
BY Philip M. Bolton
ATTORNEY

Aug. 12, 1958 W. KLOEPFER 2,847,563

CIRCUIT ARRANGEMENT FOR THE CONNECTION OF TWO-WIRE CIRCUITS TO A TRANSMISSION PATH IN INTERCOMMUNICATION SYSTEMS

Filed Oct. 30, 1953 2 Sheets-Sheet 2

INVENTOR
W. KLOEPFER
BY Philip M. Bolton
ATTORNEY

United States Patent Office 2,847,563

Patented Aug. 12, 1958

2,847,563

CIRCUIT ARRANGEMENT FOR THE CONNECTION OF TWO-WIRE CIRCUITS TO A TRANSMISSION PATH IN INTERCOMMUNICATION SYSTEMS

Walter Kloepfer, Pforzheim, Germany, assignor to International Standard Electric Corporation, New York, N. Y., a corporation of Delaware Application October 30, 1953, Serial No. 389,379

Claims priority, application Germany October 31, 1952

2 Claims. (Cl. 250—13)

This invention relates to a single frequency radio communication system, and particularly to a system in which one subscriber controls the communication.

More particularly, the invention relates to a system in which a two-way one-channel station is coupled to a two-channel two-way connecting circuit, each channel being one way.

In view of the increased use of short-wave and ultra-short wave radio telephone frequency ranges, it is becoming increasingly more desirable to utilize intercommunication service; this service generally operates on a two-way one-channel one-frequency station. This is to be contrasted with the more commonly used two-channel two-frequency system or the one-channel two-frequency system, commonly known as duplex in the radio art. According to known methods, it is difficult to switch in the usual telephone two-channel two-way circuit to the intercommunication system and it is even more difficult to connect radio communication systems with intercommunication systems. This problem particularly arises with movable radio stations such as police radio service, highway radio systems and the like, where it is necessary to switch a circuit to an existing telephone line.

Arrangements are also known in which a subscriber at one station controls the transmission path by means of an independent signal. This arrangement, however, has the disadvantage that overlapping of speech may occur because both transmission paths of the respective transmitters may be unblocked simultaneously. The result is that both parties lose their reception path because normally the unblocking of the transmission path simultaneously blocks the receiving path.

It is an object of this invention to provide a system operating on a single frequency in which a two-way one-channel circuit is coupled to a two-channel two-way circuit, each channel being one way.

It is a feature of this invention to provide a system in which the possibility of unblocking simultaneously the two transmission paths of the respective transmitters is eliminated.

Figure 1:
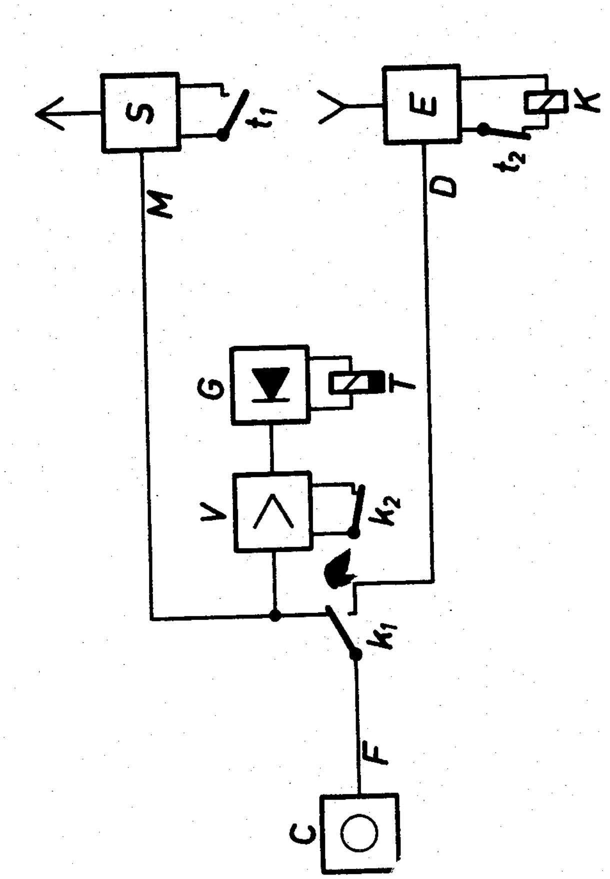
Figure 2:
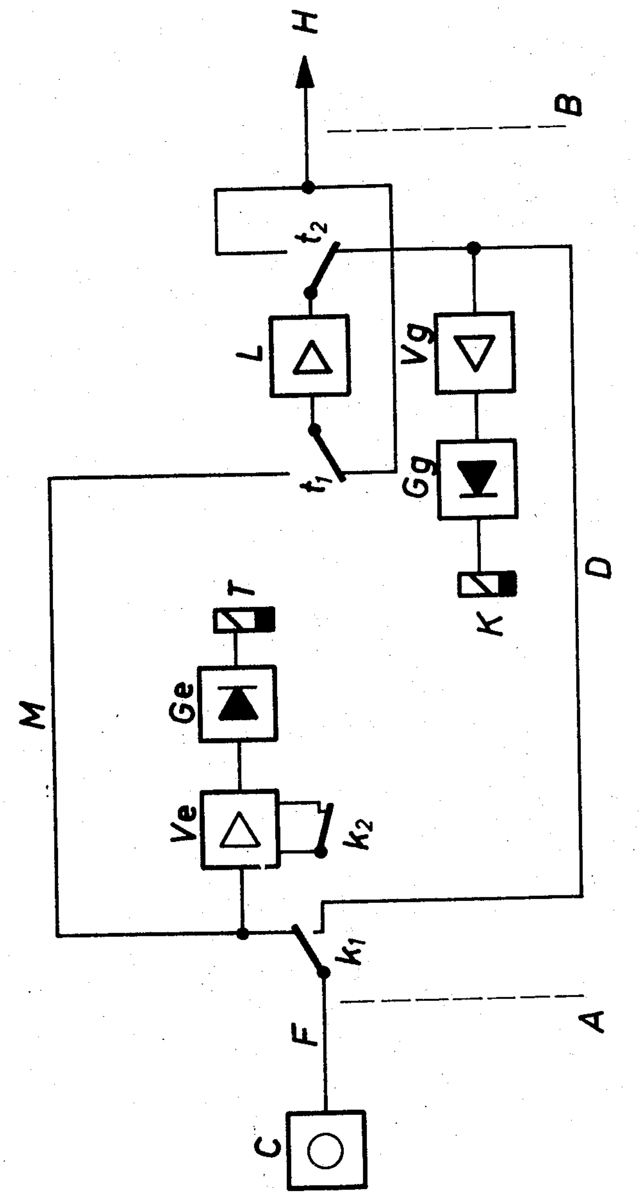

The above-mentioned and other features and objects of this invention and the manner of attaining them will become more apparent and the invention itself will be best understood by reference to the following description of an embodiment of the invention taken in conjunction with the accompanying drawings, wherein:

Fig.1 is a schematic diagram of a two-way one-channel subscribers station to a two-channel two way connecting circuit; and Fig. 2 is an alternative embodiment of Fig. 1.

In the drawings a convention is used to indicate relay windings and their associated contacts which has been generally accepted in the electrical art for the reason that it results in a considerable simplification of the circuit showing. The contacts associated with a relay are not shown directly under the relay windings but are identified by giving them the same reference in small letters as that given by a capital letter to the relay winding, the contacts associated with a particular relay winding being also given a serial number following the reference letter: thus, the contacts of relay K are indicated $k_1$, $k_2$.

Amplifiers capable of amplifying in both directions are not yet known, and therefore intercommunication systems require amplifiers for both transmitting and receiving directions. The terminal station of each such transmission path is therefore designed as a two channel connection with separate amplifiers for the transmitting and receiving direction respectively. Of course one amplifier may be used to amplify in sequence, corresponding to the direction of conversation.

Referring now to Fig. 1, the schematic circuit diagram illustrates a conventional telephone subscriber C, which may operate on local battery, central battery, or common signaling battery. Station C is connected via a typical telephone two-way circuit F to a two-channel connecting circuit via a forked repeater, represented as a relay fork with a relay contact $k_1$. The transmitter channel line is designated as a modulating line M and leads to the transmitter S, e. g. a radio telephone set. The receiver line, or demodulating line D, is connected to a receiver E of the radio telephone set. An important feature of the invention is that the transmitter S and the receiver E work on the same operating wavelength with the subscribers station C. An unblocking amplifier V is connected in parallel to the modulating line M and is responsive to low-frequency modulation originating at the subscriber station C. The speech modulated signal is rectified by the rectifier G and this rectified signal controls the operation relay T. Energization of relay T closes relay contact $t_1$ which switches on the transmitter, e. g., the contact may switch on the anode voltage for the transmitter or it may couple the transmitter to the antenna. Relay T also opens contact $t_2$ to prevent relay K from operating. To insure against the possible operation of relay K, contact $t_2$ is of the type to operate more rapidly than contact $t_1$. When controlling the line M from the subscriber C, relay T is energized immediately and releases the HF-carrier of the transmitter S. Relay T is provided with a certain delay for maintaining the unblocking of the transmitter in the case of short interruptions in the conversation.

The subscriber in addition to unblocking the transmission path at his station also controls the condition at the remote station. To illustrate this, let us assume that the station illustrated in Fig. 1 is about to transmit, and a station identical to Fig. 1 will receive this transmission. At the transmitting station the signal unblocked the transmission path and blocked the receiving path as described above. At the receiving station the incoming signal operates relay K by any well known method, e. g., utilizing the limiter current, silencer current, automatic volume control current, etc. The relay K is provided with a contact $k_1$ performing a two-way control, i. e. to connect the telephone subscriber C either in the normal position of K of the transmission path M, or to connect the subscriber, in the case of an energized relay K, to the demodulation path D. To eliminate the possibility of clicking noises, contact $k_2$ is provided and is of the type which opens more rapidly than $k_1$ to disable the electron relay V—G—T. By means of this double control, i. e. unblocking the transmission path and blocking the receiving path at the subscribers station, and blocking the transmitter and unblocking the receiver at the remote station, there is achieved a reliable intercommunication system without the possibility of involuntary cut-offs.

If considerable distances have to be bridged between the (two) opposite stations, i. e. in the case of a weak incidenting HF-carrier which would be incapable of operating the relay K, it is preferable to use a termination circuit (fork connection) without relay contacts as is the common practice in telephone engineering.

In Fig. 2 there is shown another embodiment of the invention in which a wire line supplies the transmission path for the intercommunication operation. The transmission in this example is preferably carried out at a low frequency. C again denotes the subscriber station connected via the telephone line F to the two-channel connecting circuit via the fork relay (contact $k_1$) and to the two-way line H. The transmitter S and the receiver E of Fig. 1 have been replaced by the low-frequency amplifier L, which is connected to the line H. In the normal position of the low-frequency amplifier the two-way contacts $t_1$ and $t_2$ of the relay T interconnect the lines H and D and serves as a receiving amplifier. Of course two amplifiers may be provided instead of one single reversible amplifier. The blocking amplifier $v_e$ for the amplification of speech frequencies from subscriber C is connected in parallel to the transmitting line M. The relay contacts $t_1$ and $t_2$ are arranged between the lines H and D and connect these lines via the amplifier L. In this case the low-frequency level of the opposite station will serve as the opposite circuit condition. Parallel to the line D there is arranged an amplifier $v_g$ with a rectifier $g_g$, responding to the LF-level of the opposite station and energizing the relay K, which has the same contacts $k_1$ and $k_2$ as the circuit arrangement according to Fig. 1. When controlling the station C as controlling the communication, the amplifier L will be switched-over by the relay T to serve as the "transmitting"-amplifier and provides the line H with an increased transmission level.

The circuit arrangement of Fig. 2, i. e., the portion between the two points A and B may also serve as an intermediate amplifier for very long two-wire connecting circuits. The advantage may be seen in the fact that only one single two-way line is required for bridging very long distances.

While I have described above the principles of my invention in connection with specific apparatus, it is to be clearly understood that this description is made only by way of example and not as a limitation of the scope of my invention as set forth in the objects thereof and in the accompanying claims.

What is claimed is:

1. A radio telephony communication system comprising a one-channel two-way substation circuit, a one-way transmitting channel coupled to a transmitting antenna, a one-way receiving channel coupled to a receiving antenna, said transmitting and receiving channels being tuned to operate on the same frequency, a first relay in said transmitting channel, a second relay in said receiving channel, means for energizing said first relay responsive to the transmission of telephone signals over said substation circuit, a first pair of normally-open contacts associated with said first relay and arranged upon energization of said first relay to render said transmitting channel operative, a second pair of normally-closed contacts associated with said first relay and included in the circuit of said second relay, means for energizing said second relay responsive to the reception of radio signals at said frequency, a pair of normally-closed contacts associated with said second relay and arranged upon energization of said second relay to disable said transmitting channel, and further contact means associated with said second relay and arranged upon energization of said second relay to disconnect said substation circuit from said transmitting channel and connect it to said receiving channel.

2. A system according to claim 1, wherein said second relay is of the slow release type and wherein said second pair of contacts are arranged to operate more rapidly than said first pair of contacts.

References Cited in the file of this patent

UNITED STATES PATENTS

| | | |
|---|---|---|
| 1,528,010 | Demarest et al. | Mar. 3, 1925 |
| 1,570,755 | Loynes | Jan. 26, 1926 |
| 1,691,076 | Mathes | Nov. 13, 1928 |
| 1,794,391 | Turner | Mar. 3, 1931 |
| 1,970,423 | Frink | Aug. 14, 1934 |